United States Patent [19]
Muir et al.

[11] 3,755,231

[45] Aug. 28, 1973

[54] RUBBERY COMPOSITIONS AND APPLICATIONS THEREOF

[75] Inventors: John Muir, Woodbridge; John Kavalir, Weston; Premysl Thomas Dolezal, Sarnia, Ontario, all of Canada

[73] Assignee: Shaw Pipe Industries, Ltd., Ontario, Canada

[22] Filed: Jan. 21, 1972

[21] Appl. No.: 219,820

[30] Foreign Application Priority Data
Aug. 3, 1971 Canada.............................. 119,622

[52] U.S. Cl...... 260/28.5 AS, 117/133, 260/33.6 A, 260/41.5 A, 260/876, 260/889
[51] Int. Cl.......................... C08f 45/52, C08f 45/28
[58] Field of Search............... 260/28.5 AS, 28.5 B, 260/33.6 A, 876 B, 880 B, 889

[56] References Cited
UNITED STATES PATENTS

| | | | |
|---|---|---|---|
| 3,240,844 | 3/1966 | Gruver | 260/876 B |
| 3,676,386 | 7/1972 | Brenner | 260/33.6 A |
| 3,649,584 | 3/1972 | Bailey | 260/33.6 A |
| 2,855,376 | 10/1958 | Shotton | 260/33.6 A |
| 3,433,759 | 3/1969 | Bayerl | 260/33.6 A |
| 3,635,865 | 1/1972 | Edwards | 260/28.5 B |
| 3,557,064 | 1/1971 | Edwards | 260/889 |
| 3,506,742 | 4/1970 | Buckler | 260/28.5 B |
| 3,325,430 | 6/1967 | Grasley | 260/25 |
| 3,265,765 | 8/1966 | Holden | 260/28.5 B |

*Primary Examiner*—Morris Liebman
*Assistant Examiner*—P. R. Michl
*Attorney*—J. A. Legris

[57] ABSTRACT

Liquid composition suitable for application to steel surfaces such as pipe interiors, which cure in situ to provide rubbery linings and coatings, comprise a terminally reactive diolefin polymer such as dibromopolybutadiene, a curative for the polymer, a rubbery thermoplastic polymer such as a styrene butadiene block copolymer, and a solvent.

12 Claims, No Drawings ns and methods of lining and coating process equipment with these compositions. In particular, it concerns methods of coating and/or lining pipes, pumps, tanks and other vessels and products made by these methods.

RUBBERY COMPOSITIONS AND APPLICATIONS THEREOF

BACKGROUND OF THE INVENTION

1. Field of the Invention

This invention concerns curable rubbery compositions and methods of lining and coating process equipment with these compositions. In particular, it concerns methods of coating and/or lining pipes, pumps, tanks and other vessels and products made by these methods.

It is often convenient to handle mineral ores, coal and other particulate solids as slurries in water. Such slurries are made and stored in agitated vessels and are pumped through pipelines. Since many such particulate materials are hard and abrasive by nature, a steel pipeline or a vessel handling such slurries is subjected to excessive wear on its inner surfaces, particularly at bends in the line. To reduce such abrasion it is necessary to provide the interior of such process equipment with a protective layer.

2. Description of the Prior Art

Previously it has been the custom to line such pipes with preformed sheets of calendered natural rubber crepe which are cut to the necessary size to fit inside the pipe and then adhered to the inner wall of the pipe section. Such pipe linings are expensive and difficult to apply. Furthermore the rate of abrasion even of these linings is sometimes unsatisfactory.

SUMMARY OF THE INVENTION

It is an object of this invention to provide an improved rubbery composition for coating process equipment. A further object is to provide an improved process for coating of process equipment surfaces and in particular the lining of pipes with rubbery protective material.

According to one aspect of the present invention there is provided a liquid, curable composition comprising a terminally reactive diolefin polymer, curable to a rubbery composition, a curative for said diolefin polymer, a rubbery thermoplastic polymer and a solvent for said thermoplastic ployner in an amount sufficient to maintain the viscosity of the composition below about 200,000 cps.

According to a second aspect of the invention, there is provided a process for protecting a surface of process equipment which comprises applying to said surface a liquid composition comprising a diolefin polymer having terminally reactive groups, a curative for said diolefin polymer and a rubbery thermoplastic polymer, and curing said composition on said surface to a solid rubbery condition adhering to said surface. The above process provides a rubber protected equipment suitable for handling abrasive slurries, a substantial portion of the surface of said equipment having a seamless abrasion-resistant layer of a cured rubber compound, said compound being water-resistant and having a hardness of less than about 80 points when measured using a Shore A-2 durometer.

The compositions of the present invention are viscous liquids, and cure in situ, preferably at low temperatures, suitably at room temperatures, to form resilient rubbery compositions adhering to iron or other surfaces. Being liquid, they can be applied by spraying processes, or by casting processes, dipping or other painting processes, in a rapid and economical fashion. Curing may take place without any application of external heat, merely on allowing the composition to stand. The cured composition adheres to the surface on which it is cured.

DESCRIPTION OF THE PREFERRED EMBODIMENTS

Preferably, the terminally reactive diolefin polymer is a liquid polymer of butadiene or isoprene, having terminal reactive groups such as allylic halide, hydroxyl or carboxyl groups. A butadiene polymer having terminal allylic bromide groups is most preferred. On the average, the terminally reactive polymer should have more than one reactive group per molecule. Such materials are available on the market, and in conjunction with suitable curing agents, cure to rubbery, resilient compositions at room temperatures.

Suitably, the compositions of the present invention also contain a bituminous substance such as asphalt and coal tar, which provides body to the composition and assists in providing adhesion of the composition to the surfaces. The type of curative used in this composition depends on the type of reactive group present in the polymer. It is a polyfunctional curative e.g. a polyepoxide, polyisocyanate or polyamine which is capable of reacting with terminal groups in the polymer and forming a cured structure. In the case of butadiene polymer having terminal allylic bromide groups, the curative is a polyamine, preferably a poly(alkylenimine) containing more than 5 amine nitrogen atoms per molecule.

Preferably also, the composition includes a reinforcing filler, to enhance the tensile strength and abrasion resistance of the final cured rubbery composition. Suitable fillers are mixtures of carbon black and silicas such as HiSil (trade mark).

The rubbery thermoplastic polymer which is used in the compositions of the present invention is a polymer having satisfactory rubber-like properties at room temperature and which at elevated temperature can be processed as a typical thermoplastic resin. It may be an ethylene-vinyl acetate copolymer or ethylene ethyl acrylate copolymer or a block copolymer of the $A(BA)_n$ type where A is a resinous polymeric block e.g. polyethylene or polypropylene or is a monoalkenyl aromatic hydrocarbon polymer, such as a styrene polymer or alphamethylstyrene polymer, and B is an elastomeric block, e.g. an ethylene-propylene copolymer or a conjugated diolefin polymer, such as a butadiene polymr, or an isoprene polymer. The rubbery thermoplastic polymer enhances the strength of the final cured composition.

It is necessary that the liquid composition also contain an organic solvent for the block copolymer, in an amount sufficient to maintain the viscosity of the composition below about 200,000 centipoise. It is preferred to have a viscosity of about 50,000 centipoise. Such a consistency of the composition allows application to interior relatively inaccessible surfaces, without difficulty, by a number of processes such as painting, scraping, spraying through a rotating spray head or casting centrifugally by spinning the pipe or vessel, and in sufficient thickness up to about 1 inch, to provide a resilient liner when cured. Suitably, the solvent is toluene, benzene, cyclohexane or mixtures of two or more of these. The solvent largely evaporates from the composition on curing, and is collected and re-used. In some applications, it is desirable to completely volatilise the deposited composition; for that purpose the composition is deposited in more than one thin layer, each layer being devolatilised in a manner such as to avoid blisters and pinholes in the cured surface.

The relative proportions of the various ingredients of the liquid composition can vary over fairly wide limits, and still provide a cured composition having the necessary abrasion resistance, resilience, hardness and water resistance to protect the equipment against the abrasive and corrosive effects of ore processing and transportations in slurry. Suitably, for 100 parts by weight of the terminally reactive polymer, there will be included from about 150 to about 300 parts by weight, preferably from about 200 to about 300 parts by weight of the rubbery thermoplastic polymer, from about two to about 20 parts and preferably from about five to about 12 parts by weight of the curative, from zero to about 100 parts by weight and preferably from zero parts to about 60 parts by weight of asphalt or other bituminous substance, from about 25 parts to about 60 parts by weight and preferably from about 30 parts to about 50 parts by weight of reinforcing filler and from about 100 to about 400 parts by weight, preferably from about 200 to about 300 parts by weight, of organic solvent.

The curved compositions obtained from the compositions of the present invention have the necessary resilience, tensile strength, and abrasion resistance to withstand the transportation of ore slurries for extended periods of time. The abrasion resistance and hardness of the preferred compositions according to the invention are similar to those of natural rubber linings previously used. In addition, they exhibit good resistance to attack by water and aqueous chemical solutions, such as sulphuric acid and salt which may result from a previous processing of the ore. It will be appreciated that the exposure of steel to aqueous chemical solutions, even in the absence of abrasion would rapidly destroy the steel pipeline. The presence of the rubber liners from compositions of the present invention substantially alleviates this problem.

The equipment, the surfaces of which are to be coated with the composition of this invention, may be made of a wide variety of construction materials such as cast iron, steel, stainless steel, non-ferrous metals, resins, asbestos, concrete or other composites. It includes pipes, tanks, drums, pumps, impellers, valves and similar equipment such as used for processing and transporting of slurries and corrosive liquids. In particular, the equipment that is preferably coated in accordance with this invention is steel pipeline equipment used for transportation of ore slurries, tailings and pickle liquors to and from smelters.

Under most circumstances, the compositions of the present invention can be applied directly to the surface to be protected, for example an interior surface of a steel pipe, and cured in situ to give compositions with the necessary degree of adherence to that surface. If desired, however, a very thin layer of primer can be applied to the surface prior to the application of the uncured liquid rubbery composition. Suitable priming materials for use with these compositions on steel surfaces include polyurethanes and organosilanes.

In the preferred process according to the present invention, the composition is applied to the steel surface in a liquid condition. Preferably, the liquid composition is formed into two parts, one part containing the liquid terminally reactive polymer and the other part containing the curative. In the preferred embodiment, the first part contains the liquid polymer, the filler and part of the block copolymer and the second part contains the curative and the rest of the block copolymer. The parts are adjusted so that equal volumes of the two parts are mixed together for application. These parts are mixed immediately prior to application to the steel surface. Preferably also, the steel surface is cleaned and abraded immediately prior to the application of the composition of the present invention, so as to improve the adhesion of the composition thereto. If it is desired to have a fast rate of cure, the pipe surface can be warmed internally or externally, e.g. by hot air, immediately before or after the application of the composition. Normally, however, curing takes place sufficiently rapidly at room temperature, the material being tack-free after 5–30 minutes and fully cured after 1–3 days.

A specific suitable terminally reactive liquid polymer for use in compositions of the present invention is dibromopolybutadiene, described in Canadian Pat. No. 849,617, Polymer Corporation Limited, issued Aug. 18, 1970. The poly(alkylenimine) curatives which can be used with this product are disclosed in Canadian Pat. No. 857,360 Polymer Corporation Limited, issued Dec. 1, 1970.

The invention will be further described with referenece to specific examples.

EXAMPLE 1

A composition was prepared consisting of the formulation below in parts "A" and "B":

PART "A"

| | |
|---|---|
| Dibromopolybutadiene | 100 parts by weight |
| High abrasion furnace Carbon black | 20 " " " |
| Precipitated hydrated silica | 20 " " " |
| Asphalt (Rapid cure) | 50 " " " |
| Styrene-butadiene block copolymer, of the A(BA) type, low solution viscosity | 60 " " " |
| Toluene | 75 " " " |
| | 325 parts by weight |

In preparing this the carbon black and silica fillers were incorporated into the polybutadiene by milling and the asphalt and copolymer solutions were incorporated into this material by mixing.

PART "B"

| | |
|---|---|
| Styrene-butadiene block copolymer, of the $A(BA)_x$ type, low solution viscosity | 140 parts by weight |
| Toluene 178 " " " | |
| Polyethylenimine, molecular weight about 300. | 7 " " " |
| | 325 parts by weight |

In preparing this formulation the polyethylenimine was incorporated into the copolymer solution by mixing.

Parts "A" and "B" were mixed thoroughly in the ratio 1:1 and spread on steel plaques 0.1 in. thick. One set of plaques was left to dry at room temperature, and over another was passed a stream of air at 100° F. Those retained at room temperature were found to be tack-free after 30 minutes while those heated at 100° were tack-free after 8 minutes. The coatings on the plaques were judged to be fully cured after three days at room temperature by having attained a maximum tensile strength.

EXAMPLE 2

A composition was prepared consisting of the formulations below in Parts "A" and "B."

PART "A"

| | |
|---|---|
| Dibromopolybutadiene | 100 parts by weight |
| Precipitated hydrated silica | 30 " " " |
| Styrene-butadiene block copolymer (as in Example 1) | 73 " " " |
| Toluene | 91 " " " |
| | 294 parts by weight |

PART "B"

| | |
|---|---|
| Styrene-butadiene block copolymer (as in Example 1) | 127 parts by weight |
| Toluene | 160 " " " |
| Polyethylenimine molecular weight about 300 | 7 " " " |
| | 294 parts by weight |

The components were prepared by milling and mixing as described in Example 1 and were then mixed in the ratio of 1:1. The material was fully cured after 3 days at room temperature.

EXAMPLE 3

A composition was prepared consisting of the formulation below in parts "A" and "B":

PART "A"

| | |
|---|---|
| Dibromopolybutadiene | 100 parts by weight |
| Precipitated hydrated silica | 40 " " " |
| Styrene-butadiene block copolymer, A(BA)$_n$ type low melt viscosity | 116 " " " |
| Toluene | 78 " " " |
| Cyclohexane | 39 " " " |
| | 373 parts by weight |

PART "B"

| | |
|---|---|
| Styrene-butadiene block copolymer, as in part "A" | 184 parts by weight |
| Toluene | 122 " " " |
| Cyclohexane | 60 " " " |
| Polyethylenimine molecular weight about 300 | 7 " " " |
| | 373 parts by weight |

The components were prepared by milling and mixing as described in Example 1 and were then mixed in the ratio of 1:1. The composition was spread onto a 0.1 in. thick plaque. This coating was tack-free after 5 minutes at room temperature and deemed fully cured after 3 days.

EXAMPLE 4

Coating of a Pipe

A 12 inch diameter 12 foot pipe was abraded clean by brushing and sanding.

Parts "A" and "B" as described in Example 1 above, except that the block copolymer used was an alphamethyl styrenebutadiene block copolymer of low molecular weight, were pumped in equal volumes through a mixing chamber and then through a rotating spray application head situated inside a 12 inch diameter 12 foot pipe. The application head was gradually withdrawn from the pipe at such a rate that the composition was deposited in such an amount that after curing a rubber lining 1/16 inch thick would remain. After the application head had been removed, the pipe ends were temporarily sealed and the pipe was spun at about 1,000 rpm for 20 minutes after which an even and smooth distribution of the composition was obtained, and the composition was sufficiently cured that the pipe could be stored with no further spinning required.

The physical properties of the cured pipelining so applied were as follows:

| | |
|---|---|
| Tensile strength (psi) | 2200 |
| Elongation (%) | 770 |
| 100% Modulus (psi) | 240 |
| Hardness, Shore A2 | 64 |
| Graves Tear strength (pounds per inch) | 280 |
| Peel strength (pounds per inch) | 48 |

The pipelining applied to the pipe was stored in contact with a number of aqueous solutions, for a period of 60 days at room temperature, to assess its resistance thereto, and then its physical properties were retested. Swelling tests were also conducted. The tests are given in the following table.

TABLE

| Aqueous solution | 10% NaCl | 10% NaOH | 10% Acetic Acid | 10% Sulphuric acid |
|---|---|---|---|---|
| Swelling (%) | 8.0 | 5.8 | 45.7 | 18.9 |
| Tensile strength (psi) | 1450 | 1210 | 770 | 1370 |
| Elongation (%) | 670 | 600 | 630 | 650 |
| 100% Modulus (psi) | 215 | 210 | 170 | 200 |
| Hardness (Shore A2) | 64 | 67 | 60 | 62 |

Further samples of the above pipelinings applied to the pipe were exposed to water at 150° F for 10 days. After such treatment, the pipelining showed swelling to the extent pf 53 percent, but no evidence of any chemical deterioration.

EXAMPLE 5

A cylindrical steel container, of diameter of 6 inch and height 6 inch, was lined with a composition similar to that used in Example 4. Into this container was placed a mixture of water, beach sand and crushed stone. The container was sealed and rotated on a paint mill, for 180 days. The sand and stones were changed twice during the period of tests, so that for at least the major proportion of the test period, the pipelining was subjected to abrasive materials with sharp edges and corners.

The original thickness of the lining was 0.150 in. The final thickness after this test was 0.113 in.

EXAMPLE 6

A six inch diameter steel pipe was lined with a composition and by the method of Example 4. A similar pipe was lined by gluing to the interior surface thereof a sheet of cured natural crepe rubber (trade name Linatex), according to previously proposed methods of lining slurry conveying pipes. The twp pipe linings were then subjected to abrasion tests, to compare their abrasion resistance.

Each pipe was supported horizontally and a small amount of a sand and water slurry introduced. Then a paddle wheel was inserted into each pipe which exerted an equal and constant pressure on each lining, as the paddle wheels were rotated at a constant speed of 120 rpm. The decrease in thickness of each lining was measured with a micrometer screw guage.

The lining according to Example 4 decreased in thickness at the rate of 6 microns per hour. The natural rubber lining decreased in thickness at the rate of 24 microns per hour.

EXAMPLE 7

Physical properties of the coatings of Example 1, after curing at room temperature, were determined. Suitable measurements were taken, in the standard way, at room temperature and at a lower temperature. Further measurements were taken after the coatings had been aged for 8 days at 175° F in an air ventilated oven. The results are given in Table 2 below:

|  | Unaged coating room temperature | −5°F | Aged coating Room temperature |
|---|---|---|---|
| Tensile strength, p.s.i. | 1450 | 2400 | 1500 |
| Elongation % | 730 | 630 | 560 |
| 100% moldulus p.s.i. | 215 | 440 | 370 |
| Shore hardness 2A | 45 |  | 64 |
| Glass transition temperature, °F | −130 |  |  |

What we claim as our invention is:

1. A liquid curable composition comprising:
   100 parts by weight of a liquid polymer of butadiene, said polymer having terminal allylic halide groups;
   from about 150 to about 300 parts by weight of a block copolymer of the A(AB)$_n$ type where A is a monoalkenyl aromatic hydrocarbon polymer block and B is a conjugated diolefin polymer block;
   from about 2 to about 20 parts by weight of poly-(alkyleneimine) curative;
   from 0 to about 100 parts by weight of asphalt;
   from about 25 to about 60 parts by weight of reinforcing filler;
   and from about 100 to about 400 parts by weight of organic solvent.

2. A composition as claimed in claim 1 in which the block copolymer is selected from the group consisting of styrene-butadiene copolymers and α-methylstyrenebutadiene block copolymers, and the reinforcing filler is a mixture of carbon black and silica.

3. A composition as claimed in claim 2 wherein the solvent is selected from the group consisting of toluene, benzene, cyclohexane and mixtures thereof.

4. A composition as claimed in claim 3 comprising
   100 parts by weight of liquid butadiene polymer having teriminal allylic bromide groups,
   150 to 300 parts by weight of styrene-butadiene block copolymer;
   5 to 12 parts by weight pf polyethylene imine;
   40 to 60 parts by weight of asphalt;
   25 to 60 parts by weight of reinforcing filler
   and 200 to 300 parts by weight of solvent.

5. A process for protecting the interior surface of an iron tank or pipe, which comprises applying to said surface a liquid composition comprising:
   100 parts by weight of a liquid polymer of butadiene, said polymer having terminal allylic halide groups;
   from about 150 to about 300 parts by weight of a block copolymer of the A(BA)$_n$ type where A is a monoalkenyl aromatic hydrocarbon polymer block and B is a conjugated diolefin polymer block;
   from about two to about 20 parts by weight of polyalkyleneimine curative;
   from zero to about 100 parts by weight of asphalt;
   from about 25 to about 60 parts by weight of reinforcing filler;
   and from about 100 to about 400 parts by weight of organic solvent;
   and curing said composition at ambient temperatures on said surface to a solid rubber of high abrasion resistance, adhering to said surface.

6. The process as claimed in claim 5 wherein the surface is an interior surface of an iron tank or pipe.

7. A process as claimed in claim 6, wherein the curing of the composition takes place at ambient temperatures.

8. A process as claimed in claim 7, wherein the liquid butadiene polymer and the curative therefor are contacted immediately prior to application of the composition to the surface.

9. A process as claimed in claim 8, wherein the liquid composition is applied to a pipe surface by spraying through a rotating spray head.

10. A process as claimed in claim 8 wherein the composition is applied to the pipe surface by casting from a casting head followed by centrifugally spinning the pipe.

11. A process as claimed in claim 8, which includes the steps of applying to the steel pipe surface a primer selected from the group consisting of organo-silanes and polyurethanes, prior to the application of the liquid composition thereto.

12. A process as claimed in claim 11, wherein the composition comprises 100 parts by weight of a liquid butadiene polymer having terminal allylic bromide groups, from 150 to 300 parts by weight of a styrene-butadiene or alphamethylstyrene-butadiene block copolymer, from 5 to 12 parts by weight of poly(ethylenimine), from 40 to 60 parts by weight of asphalt, from 25 to 60 parts by weight of filler and from 200 to 300 parts by weight of solvent.

* * * * *